United States Patent [19]

Piret et al.

[11] 4,294,137
[45] Oct. 13, 1981

[54] TRANSMISSION WITH VARIATOR

[75] Inventors: Jean Piret, Bougival; Michel Jallas, Garches, both of France

[73] Assignee: Regie Nationale Des Usines Renault, Boulogne-Billancourt, France

[21] Appl. No.: 21,171

[22] Filed: Mar. 16, 1979

[30] Foreign Application Priority Data

Mar. 16, 1978 [FR] France ................. 78 07643

[51] Int. Cl.³ ............................................. F16H 37/06
[52] U.S. Cl. .............................. 74/665 G; 74/665 GE
[58] Field of Search ............ 74/665 A, 665 B, 665 D, 74/665 E, 665 GA, 665 GE, 665 T, 681, 689, 700, 701; 474/86

[56] References Cited

U.S. PATENT DOCUMENTS 3,257,867  6/1966  Dennick ........................ 74/664 X
3,686,967  8/1972  Beneke .
3,968,704  7/1976  Fogelberg ................. 74/665 GE X

FOREIGN PATENT DOCUMENTS 1173510 10/1958 France .
1219000 12/1959 France .
1268226  6/1961 France .
1432631  2/1966 France .
2025545  1/1980 United Kingdom ............. 74/665 G Primary Examiner—Peter P. Nerbun
Attorney, Agent, or Firm—Oblon, Fisher, Spivak, McClelland & Maier

[57] ABSTRACT

A transmission with a variator, notably for automotive vehicles, is disclosed. The transmission is constituted by a variator which can be disconnected by engaging a constant-ratio direct drive. The engagement system is an either-or device.

7 Claims, 5 Drawing Figures

TRANSMISSION WITH VARIATOR

BACKGROUND OF THE INVENTION

1. Field of the Invention

The present invention relates to a transmission for automotive vehicles and refers more particularly to a transmission unit comprising a variator and differential group used in combination with an internal combustion engine. The axis common to the engine and the primary shaft of the variator as well as the axis of its secondary shaft are most often arranged transversally to the longitudinal axis of the vehicle.

2. Description of the Prior Art

Although numerous improvements have been made on this type of transmission, it still presents drawbacks with respect to energy economy. For reasons of space, cost and efficiency, variators usually have a range of ratios in the order of 4 or 5, while the range of ratios should be in the order of 6 to 8. Indeed, such an expanded range of ratios permits more efficient operation of most of the internal combustion engines used in automotive vehicles.

Also, efforts to improve the belt's resistance to wear cause a certain amount of over-dimensioning aimed at reducing the frequency of replacement and, on the other hand, the overall efficiency of the variator is not always satisfactory.

SUMMARY OF THE INVENTION

An object of the present invention, therefore, is to achieve a transmission offering a wider range of ratios, in the order of 6 to 8, while using a variator designed to obtain the best possible compromise in regard to space requirement, production cost and efficiency.

To this effect, another object of the invention is a transmission having the following characteristics:

A constant-ratio, direct-drive unit is mounted parallel to the unit constituted by the variator.

A clutch system permits shifting from direct drive to variator drive and vice-versa without interruption of the torque applied to the wheels.

The shifting from variator to direct drive and vice-versa can be effected automatically.

The direct drive can insure the longest ratio or the shortest ratio, depending on the various applications.

The starting or ending ratio of the variator and that of the direct drive are different.

Such a transmission, depending on the various possible embodiments of the invention, possesses the following advantages:

The variator-constant ratio drive offers a range of ratios greater than 6, while the range of ratios presented by the variator is limited to 4 or 5.

The variator is used only part of the time, so that its dimensions and its production cost can be reduced.

The shifting from variator to direct drive and vice-versa can be effected automatically.

The average efficiency of the transmission during operation is improved.

BRIEF DESCRIPTION OF THE DRAWINGS

Various other objects, features and attendant advantages of the present invention will be fully appreciated as the same becomes better understood by the following detailed description when considered in connection with the accompanying drawings wherein like reference characters designate like or correspondings parts throughout the several views, and wherein.

DETAILED DESCRIPTION OF THE PREFERRED EMBODIMENTS

Figure 1:
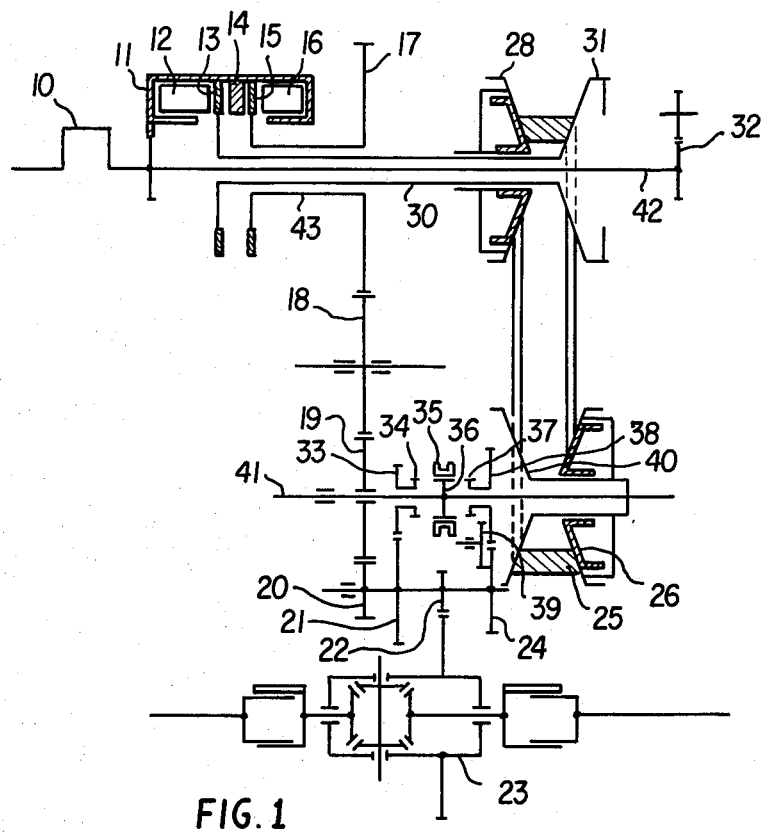
FIG. 1 represents the kinematic chain of a transmission in accordance with the invention in which the constant-ratio drive provides the longest ratio by means of gear wheels.

FIG. 1 represents the kinematic chain of a transmission that comprises a double clutch whose housing 11 is rigidly keyed to the rotation of the engine's crankshaft 10 and to that of drive shaft 42 for pump 32 of the hydraulic circuit. The housing carries in its central portion a plate 14 against which clutch discs 13 and 15 can be pressed by the action of pistons 12 and 16, respectively. Clutch disc 13 is splined to primary shaft 30 of the variator which has a central casing through which passes pump shaft 42. Clutch disc 15 is splined to shaft 43 which is keyed to gear wheel 17.

A variator whose primary and secondary parts are connected by belt 25 is shown. The primary part is constituted by sheave 31 splined to primary shaft 30 of the variator and by sheave 28. The secondary part is constituted by sheave 40 splined to secondary shaft 41 of the variator and by sheave 26.

A constant-ratio drive is shown which is constituted by gear wheel 17 driving an intermediate wheel 18 which drives gear wheel 19 mounted so as to idle on secondary shaft 41 of the variator, which gear wheel 19, in turn, drives gear wheel 20 splined to gear wheel 22 of the differential.

A reversing device is shown which is constituted by a hub 36 splined to secondary shaft 41 of the variator and by sliding gear 35 which moves on said hub 36 and which can engage either with dog clutch 34 of gear wheel 33 or with dog clutch 37 of gear wheel 38. The gear wheels 33 and 38 are mounted so as to freewheel on secondary shaft 41 of the variator and drive, respectively, gear wheel 21 and reversing gear wheel 39, the gear wheel 39 further driving gear wheel 24. Gear wheels 21 and 24 are splined to shaft 22 of the differential.

A differential control gear composed of gear is shown wheel 22 driving crown wheel 23.

The transmission represented in FIG. 1 is controlled by a hydraulic regulating circuit which is fed by pump 32.

The control system is automatic and selects the best transmission ratio by constant ratio drive or by variator drive.

This control involves various parameters, such as engine rate of revolution, carburator opening angle or vehicle speed. The automatic control processes these data so as to operate the engine within its most efficient range or so as to obtain the best possible acceleration.

As soon as engine speed has reached a prescribed limit, the sheaves 28–31 move closer to each other and the sheaves 40–26 move farther apart from each other so as to limit engine speed and to maintain optimum carburator opening for fuel economy. Above a certain engine speed and when the variator transmission ratio reaches its maximum level, clutch disc 15 is gradually pressed between piston 16 and plate 14, which is rigidly tied to clutch housing 11. The constant-ratio direct drive is then engaged and the variator is disconnected by the gradual release of clutch disc 13 during the final tightening of disc 15.

The direct drive ratio being longer (overgeared) than the longest variator ratio, the total range of transmission ratios is thus expanded.

By way of example, the following ratios between primary and secondary shaft are acceptable for a vehicle:

starting maximum variator step-down ratio: 0.445
maximum variator step-up ratio: 2.24
direct drive: 2.90
over-all ratio: 2.90/0.445≃6.5

In forward gear, engine torque is transmitted by clutch 13, sheaves 28–31 and 26–40, hub 36, sliding gear 35, dog clutch 34, gear wheels 33–21 and 22 and crown wheel 23 which drives the differential. After direct drive is engaged, the torque is no longer transmitted by clutch 13 and the variator, but rather by clutch 15, gear wheel 17, intermediate 18 and gear wheel 19, gear wheels 20, 22 and 23 which drive the differential.

In reverse, clutch 15 is released and the variator is driven by means of clutch 13 which ties the variator to the engine. The movement passes through hub 36, sliding gear 35, dog clutch 37, gear wheel 38, reversing gear wheel 39, gear wheels 24–22 and crown wheel 23 which drives the differential.

Figure 2:
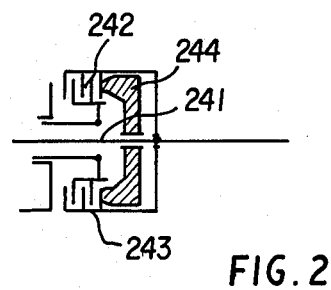
FIG. 2 represents a diagram of the clutch that can be provided between the receiving sheaves of the variator in FIG. 1 and the secondary shaft of said variator.

FIG. 2 represents the diagram of a clutch mounted between sheave 40 of the variator's secondary shaft and the secondary shaft 241. This clutch is mainly constituted by the discs 242 splined to sheave 40 and the discs 243 rigidly connected to a housing splined to secondary shaft 241. A piston 244 effects the clutch engagement or disengagement maneuver.

This clutch is engaged in forward and in reverse gear during use of the variator.

Its role is to release the variator from secondary shaft 241 as soon as the constant-ratio direct drive is engaged. In this manner, the energy losses caused by driving the variator with no load are eliminated and efficiency during the direct drive phase is improved.

Figure 3:
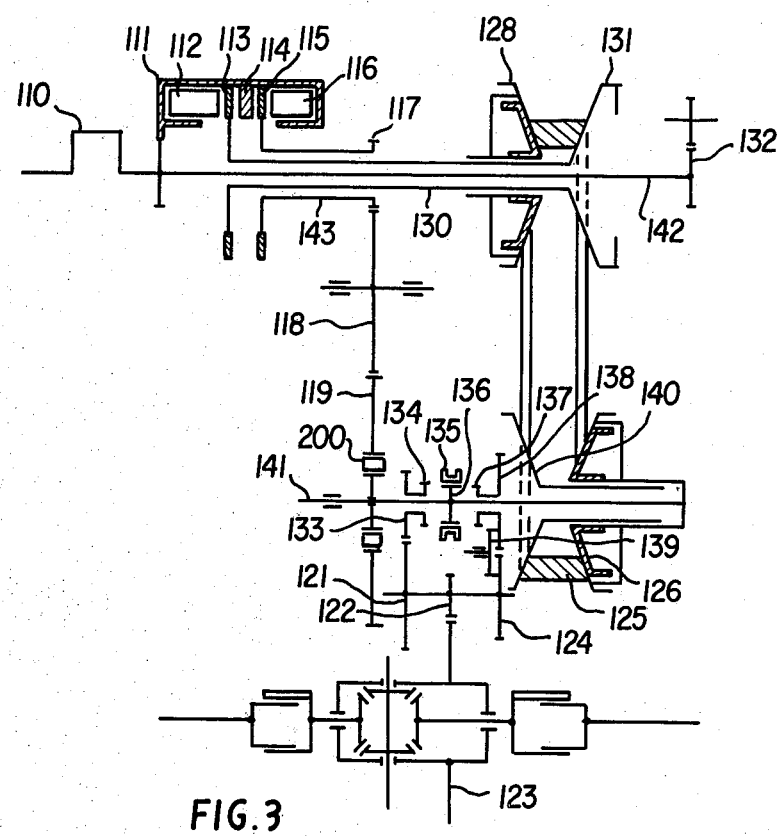
FIG. 3 represents the kinematic chain of a transmission in accordance with the invention in which the constant-ratio drive provides the shortest ratio.

FIG. 3 represents the kinematic chain of a transmission based on the same principle as the transmission in FIG. 1, but where the constant ratio drive is used for starting. This transmission comprises a double clutch constituted in the same manner as the one in FIG. 1 and having the same drives. The double clutch has a housing tied to the crankcase 110 and the pump shaft 142, and it carries a plate 114. Said clutch has discs 113 and 115, pistons 112 and 116. The clutch discs 113 and 115 are splined, respectively, to primary shaft 130 of the variator and to shaft 143 which is splined to gear wheel 117.

A variator similar to the one in FIG. 1 is shown, which is constituted by a primary part comprising a sheave 131 splined to primary shaft 130 and a sheave 128, and by a secondary part comprising a sheave 126 splined to secondary shaft 141 and a sheave 140, the two parts of the variator being connected by belt 125.

A constant-ratio drive is shown which is constituted by gear wheel 117 driving an intermediate gear wheel 118 which controls gear wheel 119 splined to secondary shaft 141 and the variator. The gear wheel 119 may be equipped with a free wheel 200.

A reversing device similar to the one in FIG. 1 is shown, which is constituted by a hub 136 splined to the secondary shaft 141, a sliding clutch 135, a gear wheel 133 with its dog clutch 134 and a gear wheel 138 with its dog clutch 137. The gear wheels 133 and 138 drive, respectively, gear wheel 121 and the reverse gear wheel 139 which drives gear wheel 124. Gear wheels 121 and 124 are splined to the shaft of the differential gear wheel.

A differential control gear similar to the one in FIG. 1 is shown with a gear wheel 122 and a crown wheel 123.

A pump similar to the one in FIG. 1 feeds a hydraulic regulating circuit. The system comprising the automatic control and regulation is based on the same principle as the one in FIG. 1 and involves the same parameters.

In forward gear, the clutch plate 115 ensures that gear wheels 117-118 and 119 are driven.

The free wheel 200 drives shaft 141, hub 136, sliding gear 135, dog clutch 134, gear wheels 133-121-122 and crown wheel 123 carried by the differential.

Above a certain engine speed and in direct relation to the position of the accelerator pedal, clutch 113 is tightened. The engine then drives sheaves 128-131 of the variator, the receiving sheaves 126-140, shaft 141, hub 136, sliding clutch 135, dog clutch 134, gear wheels 135-121-122 and crown wheel 123 carried by the differential housing.

As soon as the variator is engaged, whose shortest ratio is longer than the ratio of the constant-ratio direct drive, shaft 141 rotates at a faster rate than gear wheel 119. In order to avoid an excessive rotation rate for gear wheel 117 and for clutch disc 115, the free wheel disengages and gear wheel 119 is no longer driven.

In reverse gear, clutch 115 transmits the torque to shaft 141 by means of gear wheels 117-118 and 119 and the free wheel 200. Shaft 141 drives hub 136, sliding clutch 135, dog clutch 137, gear wheels 138-139-124-122 and crown wheel carried by the differential.

The application of the kinematic chain represented in FIG. 3 is not limited exclusively to a transmission having its shortest ratio ensured by a constant ratio direct drive.

Indeed, the ratio between gear wheels 117 and 119 can be reversed and the group of reversing gear wheels situated between shaft 141 and the differential designed so as to use the constant-ratio direct drive to achieve the longest ratio. It is thus possible to shift from one solution to the other with a maximum of shared parts.

The free wheel 200 makes it possible to shift smoothly from the constant ratio drive to the variator drive, and vice-versa.

Figure 4:
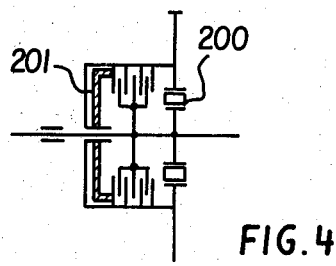
FIG. 4 represents a diagram of a coupling designed to cancel out the action of the freewheel mounted on the constant-ratio connection in FIG. 3.

FIG. 4 represents the diagram of a clutch 201 which can be mounted on gear wheel 119 and which has a structure similar to the one represented in FIG. 2. This clutch, when it is engaged, connects gear wheel 119 to secondary shaft 141. This clutch 201 eliminates the action of the free wheel which is, favorable to transient operating conditions and makes it possible to ensure engine braking.

Figure 5:
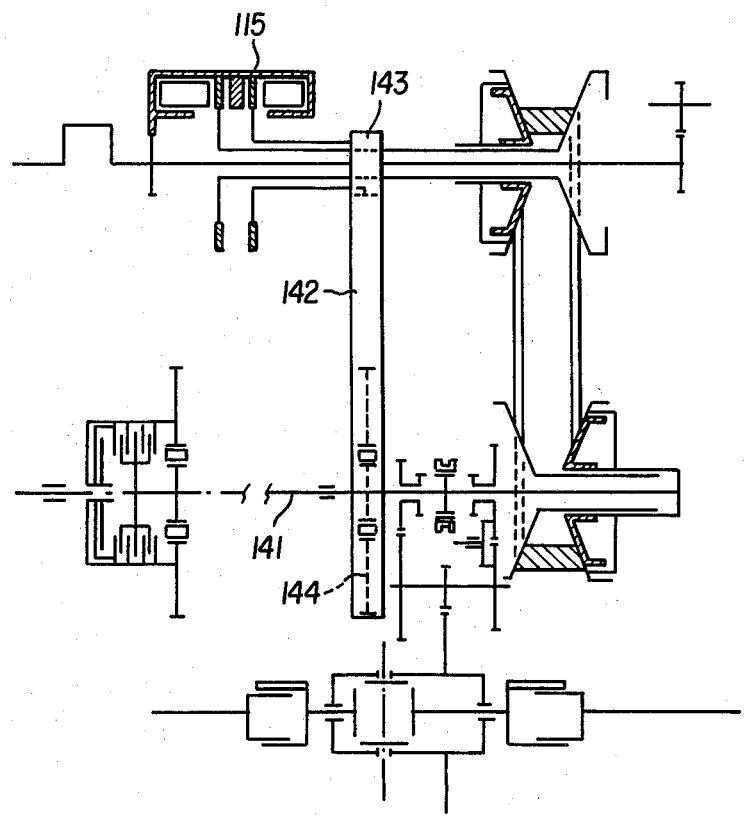
FIG. 5 represents the kinematic chain of a transmission in accordance with the same principle as in FIG. 3, where the constant-ratio drive is constituted by a chain.

FIG. 5 represents the kinematic chain of a transmission in accordance with the same principle as the one in FIGS. 3 and 4, but with a different constant-ratio drive. This constant ratio drive is constituted by a chain driven by the chain gear wheel splined to clutch disc 115. The chain 142 controls gear wheel 144 which drives secondary shaft 141.

FIGS. 1 and 3 represent kinematic chains in which the direct drive is placed between the variator and the engine for particular reasons of structure, but it is quite evident that the positions of the variator and of the direct drive can be reversed so as to place the variator between the constant-ratio drive and the engine.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. An automotive vehicle transmission having both variable transmission ratios and constant transmission ratios, said transmission being coupled to an automobile engine and comprising:
  a variator providing a predetermined range of variable transmission ratios and including a primary shaft driven by said engine, a plurality of driving sheaves carried by said primary shaft, a plurality of driven sheaves, and a secondary shaft supporting said driven sheaves; and
  a constant ratio direct drive located between said engine and said variator and providing a constant transmission ratio different from said predetermined range of variable transmission ratios;
  wherein the engagement of said constant ratio direct drive releases said variator and the engagement of said variator releases said constant ratio direct drive,
  whereby said transmission provides an increased range of ratios for a given size variator.

2. An automotive vehicle transmission having both variable transmission ratios and constant transmission ratios, said transmission being coupled to an automobile engine and comprising:
  a variator providing a predetermined range of variable transmission ratios and including a primary shaft driven by said engine, a plurality of driving sheaves carried by said primary shaft, a plurality of driven sheaves, and a secondary shaft supporting said driven sheaves; and
  a constant ratio direct drive having said variator located between it and said engine and providing a constant transmission ratio different from said predetermined range of variable transmission ratios;
  wherein the engagement of said constant ratio direct drive releases said variator and the engagement of said variator releases said constant ratio direct drive,
  whereby said transmission provides an increased range of ratios for a given size variator.

3. A transmission in accordance with claim 1 or 2 wherein said engagement is provided by an engagement system comprising a double clutch with two coaxial driven shafts, said driven shafts permitting the passage of a central coaxial pump driving shaft.

4. A transmission in accordance with claim 1 or 2 wherein said constant-ratio direct drive is constituted by two gear wheels and a chain connecting said two gear wheels.

5. A transmission in accordance with claim 1 or 2 wherein said constant-ratio direct drive comprises a receiving gear wheel including a free wheel.

6. A transmission in accordance with claim 5, wherein said free wheel includes a clutch.

7. A transmission in accordance with claim 3 wherein said variator includes on its secondary shaft a clutch connecting said driven sheave to said secondary shaft.

* * * * *